United States Patent Office 3,621,708
Patented Nov. 23, 1971

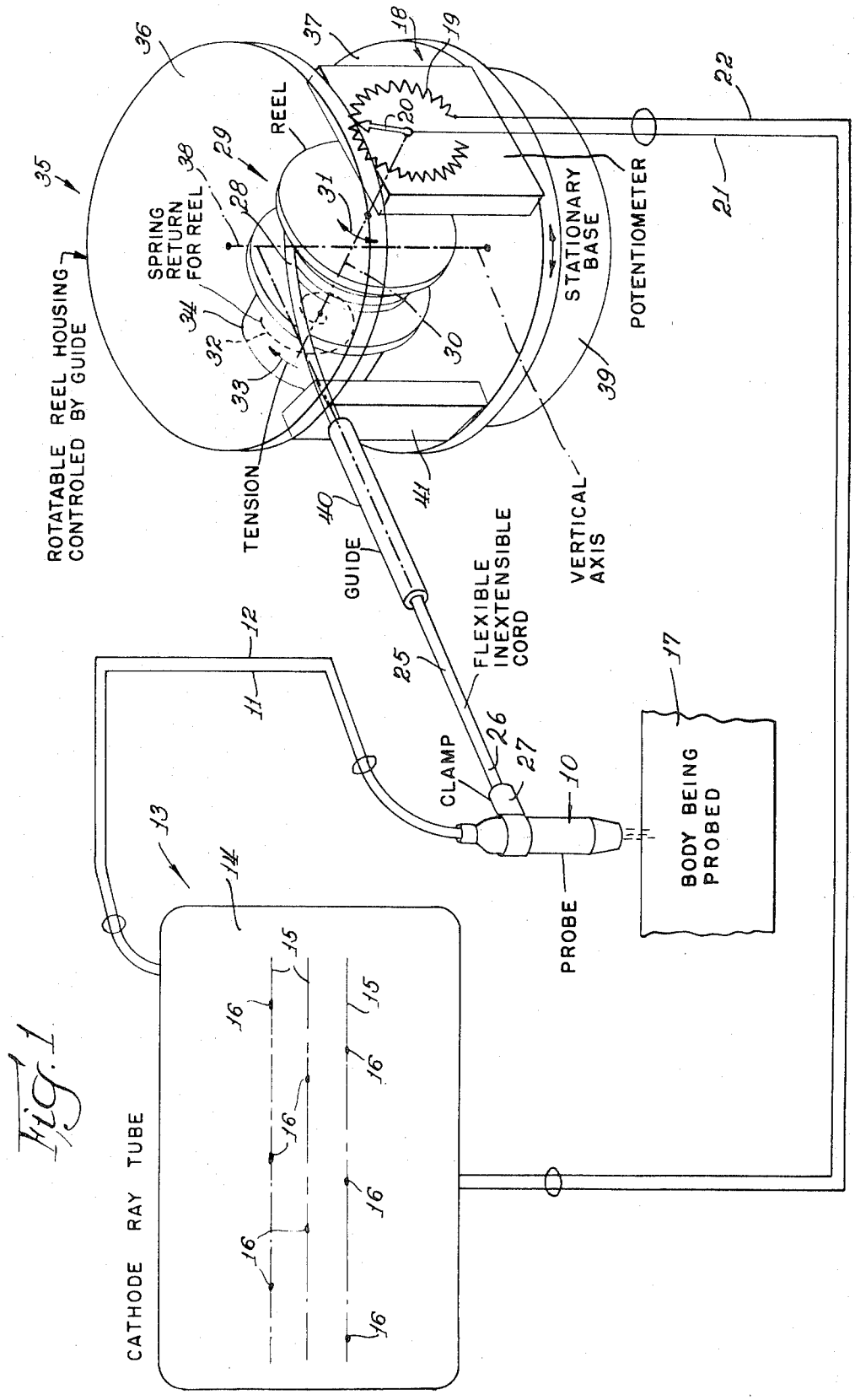

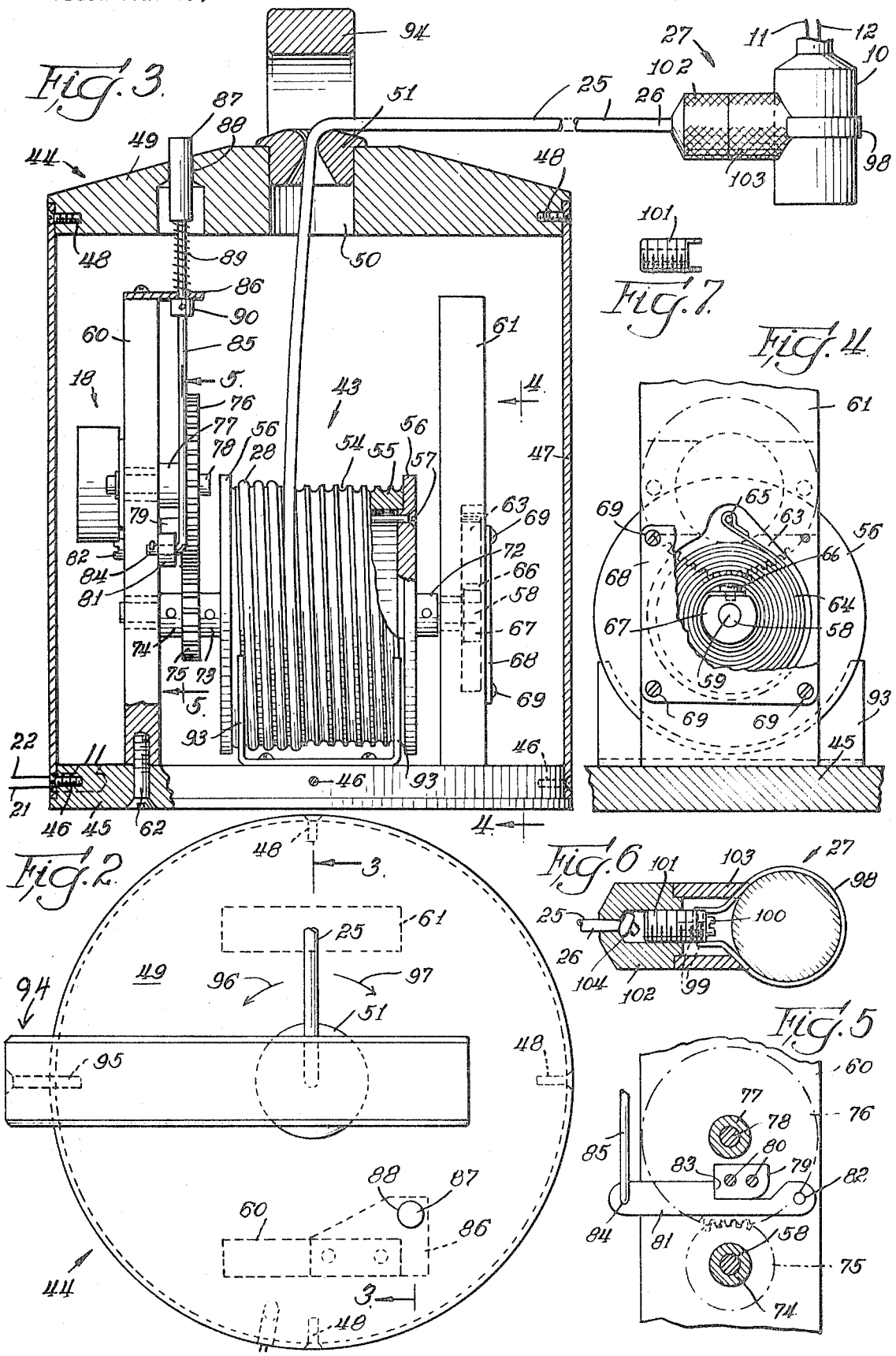

3,621,708
APPPARATUS FOR DETECTING INTERFACES
IN A BODY
Stelios Regas, 3021 E. 7th Ave., Denver, Colo. 80206
Continuation-in-part of application Ser. No. 752,874,
Aug. 15, 1968. This application June 19, 1970,
Ser. No. 47,819
Int. Cl. G01n 24/00
U.S. Cl. 73—67.8 S                                      4 Claims

ABSTRACT OF THE DISCLOSURE

The position of the sweep on the screen of a cathode ray tube along which traces appear corresponding to interfaces in a body detected by an ultrasonic probe is controlled by variable impedance means operated by a reel on which an inextensible cord connected to the probe is wound. The cord is unwound against the biasing action of a spring and extends through a guide tube. The variable impedance means, reel and guide tube are mounted to pivot about an axis perpendicular to the axis of pivotal movement of the reel. In one embodiment the reel is rotatable about a horizontal axis in a housing that is rotatable about a vertical axis with the cord extending radially from the housing. In another embodiment the reel is rotatable about a horizontal axis in a stationary housing and the cord is withdrawn through a bushing in a top plate and in any generally radial direction. Provision is made for releasing the spring biased reel in steps corresponding to one complete revolution of the variable impedance means.

---

This application is a continuation-in-part of application Ser. No. 752,874, filed Aug. 15, 1968, now abandoned.

Among the objects of this invention are: To provide for mounting an ultrasonic probe for linear movement in a new and improved manner; to connect one end of an inextensible cord to the probe and to wind the other end on a spring biased reel; to guide the cord in its movement from and to the reel; to change the position of variable impedance means in accordance with the pivotal movement of the reel in change the location of the sweep on the screen of a cathode ray tube along which traces appear corresponding to interfaces in a body detected by the probe; to mount the reel, guide and variable impedance means for pivotal movement about an axis perpendicular to the axis of pivotal movement of the reel; to mount the reel for rotation about a horizontal axis in a relatively stationary housing; to withdraw the cord through the top of the stationary housing; to arrange for one complete revolution of the variable impedance means for a given length of cord which may be one-third of the length that can be withdrawn to effect a complete change or displacement in the location of the sweep on the cathode ray tube; and to release the reel for successive extensions of the cord to permit the same change or displacement in the location of the sweep on the cathode ray tube.

In the drawings: FIG. 1 shows diagrammatically and in perspective one embodiment of apparatus responsive to the linear movement of an ultrasonic probe embodying this invention. FIG. 2 is a top plan view of another embodiment of this invention. FIG. 3 is a vertical sectional view taken generally along line 3—3 of FIG. 2, certain parts being broken away in order to show more clearly certain details on construction. FIG. 4 is a vertical sectional view taken generally along line 4—4 of FIG. 3. FIG. 5 is a vertical sectional view taken generally along line 5—5 of FIG. 3. FIG. 6 is a horizontal sectional view showing certain details of construction of the clamp for the probe. FIG. 7 is a view, in side elevation, of the tightener screw employed in the clamp construction.

In FIG. 1 of the drawings an ultrasonic probe is indicated at 10. It is arranged to transmit high frequency mechanical vibrations and to receive echoes therefrom on encountering an interface in a body being examined and applying them to a cathode ray tube to be reproduced on a screen along a sweep at locations corresponding to the location in the body of each intercepted interface. The probe 10 is connected by conductors 11 and 12 to cathode ray tube means, indicated generally at 13, having a screen 14. In one position of the probe 10 a sweep 15 is formed horizontally of the screen 14 along which traces 16 appear which correspond to interfaces in a body 17 that is being examined by the probe 10. Additional traces 16 are displayed on the screen 14 along other sweeps 15 as the probe 10 is moved linearly with respect to the body 17. The sweeps 15 are spaced apart under the control of a variable impedance device that is indicated, generally, at 18 and may comprise a circularly disposed resistor 19 that is arranged to be engaged by a contact arm 20. Conductors 21 and 22 connect the variable impedance device 18 to the cathode ray tube means 13 to apply the necessary control for spacing the sweeps 15 in the manner indicated.

It is desirable that the movement of the probe 10 with respect to the body 17 be linear and that the position of the contact arm 20 be controlled in accordance with the linear movement of the probe 10. For this purpose a flexible inextensible member 25 is employed. It is in the form of a cord or the like having one end 26 secured by a clamp 27 to the probe 10. The other end 28 of the flexible inextensible member 25 is wound on a reel 29 that is pivoted about a horizontal axis 30. Its pivotal movement is indicated by the double head arrow 31. The flexible inextensible member 25 is arranged to be unwound from the reel 29 against the biasing action of a spiral spring 32 which acts in the direction indicated by arrow 33 to tension the member 25. The spiral spring 32 is positioned within a spring housing 34.

The contact arm 20 of the variable impedance device 18 is directly connected to the reel 19 and it is pivoted therewith. Thus the position of the contact arm 20 with respect to the resistor 19 varies directly in accordance with the movement of the reel 29 and, in turn, in accordance with the extent that the flexible inextensible member 25 is unwound from or is wound on the reel 29.

In order to provide flexibility in the direction of linear movement of the probe 10, the reel 29 is mounted in a reel housing that is indicated, generally, at 35. The reel housing 35 comprises upper and lower frame plates 36 and 37 that are suitably spaced apart and carry bearings (not shown) to accommodate the pivotal mounting of the reel 29. Preferably the frame plates 36 and 37 are formed of transparent material, although this is not essential. The reel housing 35 is mounted for pivotal movement about a vertical axis 38 which extends at right angles to the horizontal axis 30 about which the reel 29 pivots. A suitable stationary base 39 is located underneath the lower frame plate 37 to provide for pivotally mounting the reel housing 35.

With a view to assisting in the linear movement of the probe 10 the flexible inextensible member 25 extends through a guide tube 40 which is carried by a suitable support 41 between the upper and lower frame plates 36 and 37. The guide tube 40 extends in a radial direction from the vertical axis 38.

In operation, assuming that the cathode ray tube means 13 is properly energized, the probe 10 is moved to a first position with respect to the body 17. This may correspond to a position in which intercepted interfaces appear along the top sweep 15 on the screen 14. By moving the probe 10 linearly with respect to the body 17 and unwinding the flexible inextensible member 25 from the reel 29, the sweep is shifted to the middle sweep 15 by the corresponding movement of the contact arm 20 with respect to the resistor 19. The detected interfaces 16 appearing along this sweep are shown in the drawing. A still further outward movement of the probe 10 effect a corresponding further movement of the contact arm 20 along the resistor 19 so that the sweep 15 is shifted to the lowermost position and the traces 16 appearing therealong are as shown on the screen 14.

In FIGS. 2–7 are shown the details of construction of another mechanism for operation in conjunction with the ultrasonic probe 10 which is connected by conductors 11 and 12 to control the functioning of the cathode ray tube means 13 previously described. As before a variable impedance device, indicated generally at 18, is employed and it is connected by conductors 21 and 22 to control the positions of the sweeps 15. A flexible inextensible cord 25 is connected at one end 26 to the probe clamp 27 the details of construction of which are set forth hereinafter. The other end 28 of the flexible inextensible member or cord 25 is connected to be wound on a reel that is indicated, generally, at 43.

The reel 43 is mounted for rotation about a horizontal axis within a housing that is indicated, generally at 44 in FIGS. 2 and 3. The housing 44 includes a circular base plate 45 that is formed of suitable metal. Screws 46 serve to hold the lower end of a shell 47 to the base plate 45. The shell 47 may be formed of aluminum or other light weight material. Screws 48 secure the upper end of the shell 47 to a top plate 49 which is circular in configuration and may be formed of aluminum. The top plate 49 has a central opening 50 for receiving a bushing 51 through which the flexible inextensible member or cord 25 is guided for movement in any generally radial direction.

The member or cord 25 is arranged to be wound in a spiral groove 54 that is formed in the surface of a drum 55 which is positioned between drum hubs 56. Bolts 57, one of which is illustrated, serve to hold the drum hubs 56 against the ends of the drum 55. The drum 55, which forms the reel 43, is mounted for rotation with a shaft 58 to pivot about a horizontal axis 59, FIG. 4 within the housing 44. The shaft 58 is journaled in metallic shaft hangers 60 and 61 which are secured to the base plate 45 by screws one of which is shown at 62 in FIG. 3.

The shaft hanger 61 has a recess 63 formed therein for receiving a spiral spring 64 for the purpose of biasing the reel 43 in a direction to wind the member or cord 25 thereon. One end of the spiral spring 64 is anchored by a pin 65, FIG. 4, to the shaft hanger 61 while the inner end is secured by a screw 66 to a spring anchor 67 that is secured to the shaft 58 and rotates therewith. A cover plate 68 overlies the spiral spring 64 and is held in position on the shaft hanger 61 by screws 69.

The drum 55 is secured to the shaft 58 for pivotal movement therewith. For this purpose collars 72 and 73 are secured to and extend outwardly from the outer sides of the drum hubs 56 and are secured by set screws to the shaft 58.

The variable impedance device 18 or potentiometer 18 is driven by the drum 55 in accordance with the extent of relative movement of the member or cord 25. For this purpose a reduction gear train comprising gears 75 and 76 is employed. The gear 75 has secured thereto a collar 74 which is secured against rotation to the shaft 58 by a set screw. A collar 77, secured to the gear 76 is secured by a set screw to a shaft 78 which extends into the variable impedance device 18 and has secured thereto the contact arm 20, FIG. 1, which is arranged to have variable contact with the circularly disposed resistor 19 and therewith forms a potentiometer construction.

It is desirable to have a predetermined relation between the linear movement of the probe 10 and the movement of the contact arm 20 of the variable impedance device 18. For example it may be assumed that a linear movement of 18 inches of the probe 10 or corresponding withdrawal of the member or cord 25 from the drum 55 will correspond to one complete rotation of the contact arm 20. This corresponds to the full excursion of the controlling voltage applied to the cathode ray tube means 13 over the conductors 21 and 22. This voltage can correspond to a shift from —15 volts to +10 volts that obviously can be anything depending upon the requirements of the cathode ray tube means 13 displaying the sweeps 15. By suitable circuit adjustment the voltage variation can be changed to correspond to certain variation of the position of the sweep 15. For example, 18 inches of travel of the probe 10 can correspond to a 4-inch displacement of the sweep 15 on the cathode ray tube means 13. The adjustment may be such that 6 inches of travel of the probe 10 in a linear direction can correspond to 4 inches of displacement of the sweep 15 on the screen 14. It will be understood that these figures are given for illustrative purposes and that other relationships can be established.

It may be desirable to position the probe 10 at different distances from the housing 44 depending upon the position of the body 17 being probed. Thus it may be desirable to move the probe 10 to a second or a third extent of travel of the member or cord 25 while, for each unit extent effecting a complete revolution of the contact arm 20 of the variable impedance device 18.

For the purpose of variably positioning the probe 10 for any one of the desired excursions a cam 79, FIG. 5, is secured by screws 80 to the gear 76. A cam stop lever 81 cooperates with the cam 79. It is pivoted at 82 to the shaft hanger 60 and has a shoulder 83 for engaging the cam 79. An out turned end 84 of a control rod 85 is connected to the distal end of the cam stop lever 81 for releasing it to permit the spiral spring 64 to withdraw the member or cord 25 during the next excursion. Stated differently when the cam stop lever 81 is shifted downwardly to move its shoulder 83 out of engagement with the cam 79, the member or cord 25 can be withdrawn for the next unit excursion. The control rod 85 is manually operable and extends upwardly through a guide plate 86 that is secured to the upper end of the shaft hanger 60. At its upper end the control rod 85 has a push button 87 mounted thereon which is cylindrical in shape and extends through a suitable opening 88 in the top plate 49. A coil compression spring 89 is interposed between the upper side of the guide plate 86 and the lower end of the push button 87 for the purpose of biasing the control rod 85 upwardly. A collar 90 secured to the control rod 85 underneath the guide plate 86 limits the upward movement of the control rod 85.

When the push button 87 is depressed the shoulder 83 is moved downwardly and out of engagement with the cam 79. The member or cord 25 then can be withdrawn for the next unit excursion and the push button 87 can be released. By this time the cam 79 is moved away from the cam stop lever 81 and automatically engages it at the end of the unit excursion provided that the member or cord 25 is withdrawn to that extent. Then the operation can be repeated.

For directing the member or cord 25 into the spiral groove 54 on the drum 55 a U-shaped guard 93, FIGS. 3 and 4, is employed. The guard 93 is suitably secured to the circular base plate 45 and its ends extend upwardly inside the drum hubs 56.

For manipulating the housing 44 there is provided an L-shaped metallic handle 94. It is secured by screws one of which is shown at 95 in FIG. 2 to the base plate 45 and top plate 49.

It will be observed that the member or cord 25 can be shifted in any generally radial direction with respect to the bushing 51. This is indicated by the oppositely directed arrows 96 and 97 in FIG. 2. At the same time the linear displacement of the probe 10 always is reflected in the position of the contact arm 20 of the variable impedance device 18.

Particular attention is directed to the construction of the clamp 27 with reference to FIGS. 3, 6 and 7. A clamp band 98 extends around the probe 10 and its ends 99 overlap and are secured by a screw 100 to a tightener screw 101 which is externally threaded. A clamp tightener nut 102, having a knurled surface, is threaded on the tightener screw 101 to bring a probe clamp 103, also having a knurled surface, into clamping engagement with the external surface of the probe 10 while pulling the clamp band 98 into clamping position on tightening of the nut 102 on the screw 101.

In FIG. 6 it will be noted that the end 26 of the member or cord 25 extends into the nut 102 and is formed into a knot 104 to hold it in place.

What is claimed as new is:

1. Apparatus for detecting interfaces inside a body comprising
   cathode ray tube means having a screen,
   probe means for transmitting high frequency mechanical vibrations and receiving echoes therefrom on encountering an interface and applying them to said cathode ray tube means to be reproduced on said screen along a sweep thereof at locations corresponding to the location in said body of each intercepted interface,
   a flexible inextensible member connected at one end to said probe,
   a reel mounted for pivotal movement about a horizontal axis between upper and lower plates and having the other end of said member wound thereon and biased in a winding direction,
   means mounting said plates for pivotal movement about a vertical axis intersecting said horizontal axis,
   a guide tube between said probe means and said reel, mounted on said plates, and extending radially from said vertical axis for receiving said flexible inextensible member and guiding the same,
   variable impedance means mounted between said plates, responsive to pivotal movement of said reel in response to movement of said probe toward or away from said reel, and connected to said cathode ray tube for changing the position of said sweep on said screen with the distance between the sweeps corresponding to the extent of said movement of said probe, and
   means mounting said reel for pivotal movement about an axis perpendicular to the axis about which said reel pivots in its movement in response to movement of said probe toward and away from said reel.

2. Apparatus for detecting interfaces inside a body comprising
   cathode ray tube means having a screen,
   probe means for transmitting high frequency mechanical vibrations and receiving echoes therefrom on encountering an interface and applying them to said cathode ray tube means to be reproduced on said screen along a sweep thereof at locations corresponding to the location in said body of each intercepted interface,
   a single flexible inextensible member connected at one end to said probe,
   a reel having the other end of said member wound thereon and biased in a winding direction,
   said inextensible member being capable of being unwound from said reel successively through at least two unit distances each corresponding to one complete revolution of said variable impedance means.

3. Apparatus for detecting interfaces inside a body comprising
   cathode ray tube means having a screen,
   probe means for transmitting high frequency mechanical vibrations and receiving echoes therefrom on encountering an interface and applying them to said cathode ray tube means to be reproduced on said screen along a sweep thereof at locations corresponding to the location in said body of each intercepted interface,
   a single flexible inextensible member connected at one end to said probe,
   a reel having the other end of said member wound thereon and biased in a winding direction, and
   manually releasable stop means cooperating with said variable impedance means to release it for rotation for more than one revolution.

4. Apparatus for detecting interfaces according to claim 3 wherein:
   said reel is mounted in a housing to pivot about a horizonal axis,
   a gear train provides a driving connection between said reel and said variable impedance means, and
   said stop means includes:
   a cam secured to one of the gears of said gear train,
   a cam stop for cooperating with said cam, and
   a manually operable spring biased rod extending externally of said housing and connected to said cam stop.

References Cited

UNITED STATES PATENTS 3,349,609  10/1967  Ryzhov-Nikonov et al. _ 73—67.9

OTHER REFERENCES

Article: "Ultrasonic Flaw Plotting Equip.," Buchanan & Hastings, in "Non-Destructive Testing," September–October 1955, pp. 17–25.

RICHARD C. QUEISSER, Primary Examiner

A. KORKOSZ, Assistant Examiner